Feb. 26, 1952 C. W. DURHAM 2,587,298
POWER-OPERATED LAWN MOWER
Filed Dec. 5, 1947 3 Sheets-Sheet 1
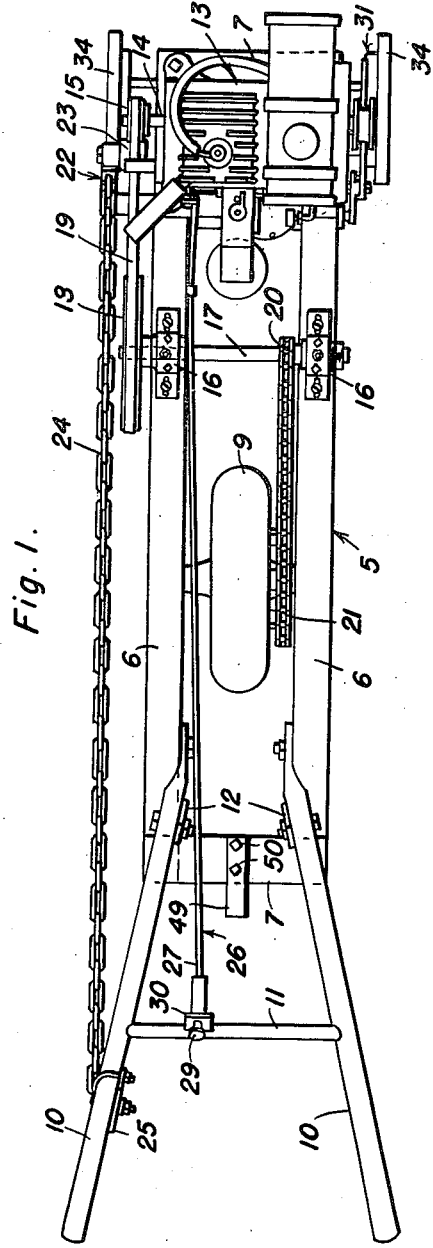
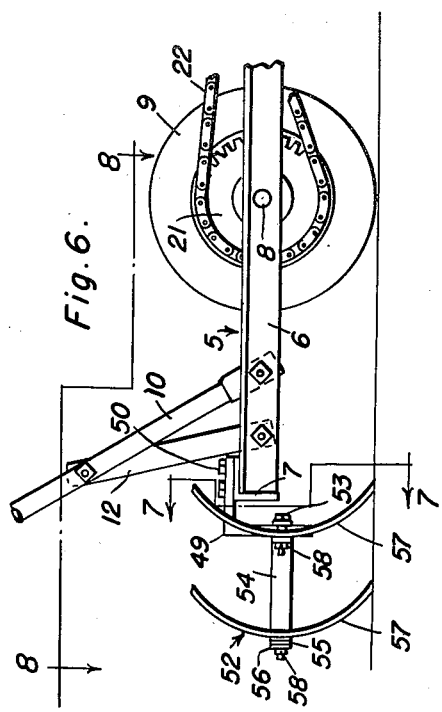
Corbin W. Durham
INVENTOR.

Feb. 26, 1952      C. W. DURHAM      2,587,298
POWER-OPERATED LAWN MOWER
Filed Dec. 5, 1947      3 Sheets-Sheet 2
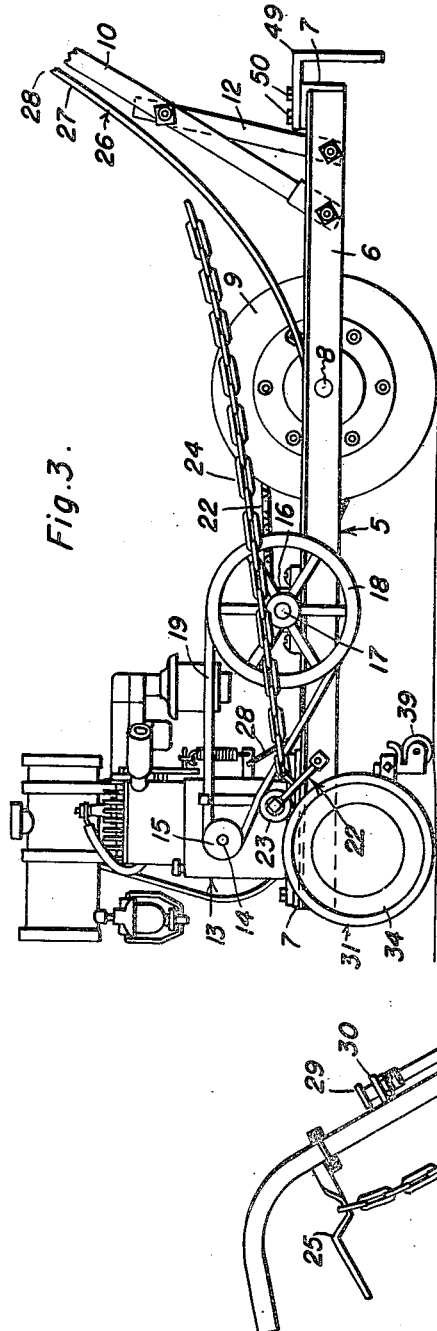
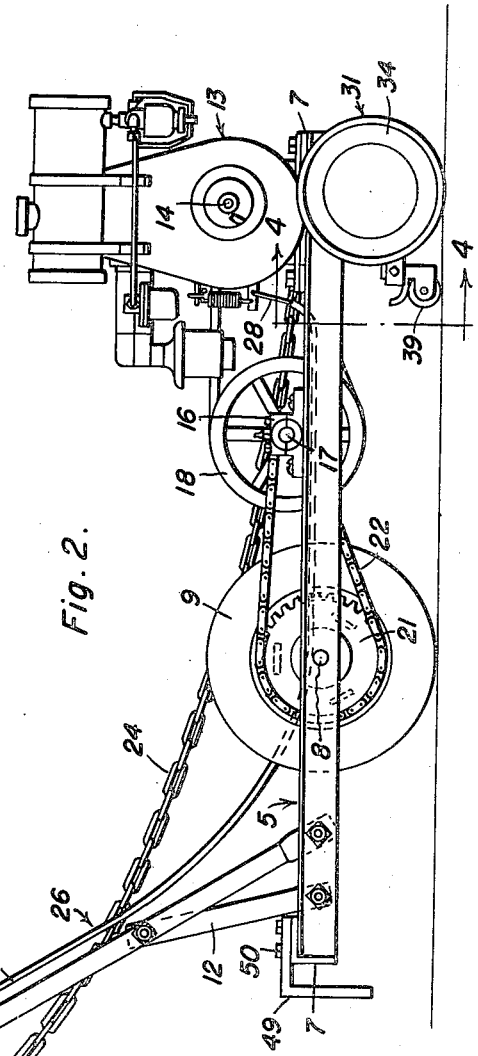
Corbin W. Durham
INVENTOR.

Feb. 26, 1952 C. W. DURHAM 2,587,298
POWER-OPERATED LAWN MOWER
Filed Dec. 5, 1947 3 Sheets-Sheet 3
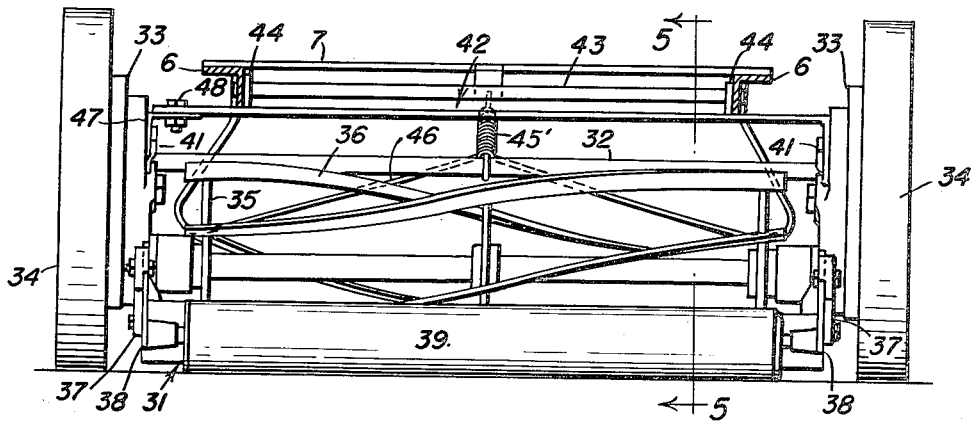

Patented Feb. 26, 1952

2,587,298

UNITED STATES PATENT OFFICE 2,587,298

POWER-OPERATED LAWN MOWER

Corbin W. Durham, High Rock, Pa.

Application December 5, 1947, Serial No. 789,828

1 Claim. (Cl. 56—26)

This invention relates to an improved garden tractor of the power driven and manually steered type which is adapted to have different inplements, such as a lawn mower or a cultivator, attached thereto.

An object of the invention is to provide a comparatively light garden tractor of the above kind which may be economically produced and operated, as well as easily guided and controlled.

Another object of the invention is to provide a tractor of the above kind which has but a single traction wheel, and in which the driving engine for the traction wheel is mounted on the frame of the tractor in front of said traction wheel, whereby the weight of the engine may forwardly tilt the frame to effect good tractive engagement of the wheels of the lawn mower with the ground, or whereby downward pressure on the handles of the tractor may effect rearward tilting of the frame in opposition to the weight of the engine to effect penetration of the ground to the desired depth by the earth working elements of a cultivator or the like attached to the rear of the tractor frame.

Still another object of the invention is to provide an efficient and exceedingly simple means for quickly detachably connecting a lawn mower to the tractor.

The exact nature of the present invention, as well as other objects and features thereof, will become apparent from the following description when considered in connection with the accompanying drawings, in which:

Figure 1 is a top plan view of a garden tractor constructed in accordance with the present invention, and having a lawn mower operatively associated therewith;

Figure 2 is a side elevational view thereof, looking upwardly at Figure 1;

Figure 3 is a side elevational view, partly broken away and looking at the opposite side of the tractor from that shown in Figure 2;

Figure 4 is an enlarged transverse section taken on line 4—4 of Figure 2, with the engine omitted;

Figure 5 is a fragmentary vertical longitudinal section taken on line 5—5 of Figure 4;

Figure 6 is a fragmentary side elevational view showing the rear portion of the tractor having a cultivating unit attached thereto;

Figure 7 is a vertical transverse section taken on line 7—7 of Figure 6, and

Figure 8 is a horizontal section taken on line 8—8 of Figure 6.

Referring in detail to the drawings, 5 indicates an elongated rectangular frame composed of parallel side rails 6 and transverse members 7 rigidly connecting the ends of said rails 6. Between the ends of the frame 5 and at a point nearer the rear transverse member 7 than the front transverse member 7, the rails 6 are connected by a transverse axle 8 on which is suitably journalled a single traction wheel 9, which is disposed between the side rails 6 and is preferably of the type equipped with a pneumatic tire. At its rear end, the frame 5 is provided with a pair of handles 10 that extend upwardly and rearwardly from the respective side rails 6 in rearwardly diverging relation, and that are rigidly connected intermediate their ends by a cross brace 11. Other braces 12 are provided between the handles 10 and the frame 5, and the lower ends of the handles 10 and braces 12 are pivotally and detachably bolted to the frame 5 as shown so that by disconnecting the lower ends of the braces 12 from the frame 5 and loosening the bolts which attach the handles to the frame, said handles may be swung forwardly and downwardly to a compact position for convenient storage or shipment of the tractor.

Mounted upon the transverse frame members 7 at the front end of the frame 5 is a commercial or conventional gasoline engine or power unit 13 whose drive shaft 14 is disposed transversely of the frame 5 and is equipped with a pulley 15. Journalled transversely of the frame 5 in bearings 16 secured upon the side rails 6, and at a point between the engine 13 and traction wheel 9, is a countershaft 17 having a large pulley 18 secured on an end thereof in line with pulley 15. An endless transmission belt 19 passes around the pulleys 15 and 18 to transmit power from the engine to said shaft 17. A small sprocket wheel 20 is also secured on countershaft 17 in line with a large sprocket wheel 21 attached to one side of the tractor wheel 9, and an endless sprocket chain 22 passes around the sprocket wheels 20 and 21 to transmit rotation of shaft 17 to the traction wheel 9. The transmission belt 19 is normally loose so that it does not transmit power from the engine shaft 17, but a belt tightener generally indicated at 22 is mounted on the adjacent side of frame 5 and operable to tighten the belt 19 so as to cause power to be transmitted from the engine to shaft 17 whenever desired. This belt tightener may consist of an arm hinged to the frame and having a pulley 23 at its free end engaged with the belt 19 as clearly shown. The arm of the belt tightener is arranged so that it is adapted to swing upwardly and rearwardly to effect tightening of belt 19, and such movement of the belt tightener arm may be effected by a rearward pull on a chain or equivalent flexible member 24 attached thereto and extending to a lever 25 pivotally mounted on one of the handles 10 near the free or grip end thereof. The engine or power plant 13 is provided with a suitable operating means for the throttle valve thereof, which operating means includes a Bowden wire control device 26 composed of a guide tube 27 and a flexible wire 28 extending through said guide tube and operatively connected to the throttle valve at one end, the other end of said wire 28 being equipped with a handle or knob 29 located at the cross brace 11 within convenient reach of the operator grasping the handles 10 at the rear of the tractor. The guide tube 27 is suitably attached at the end thereof which is adjacent the handle or knob 29, to the brace 11 as at 30. It will be apparent that the drive between the engine and the traction wheel is in the nature of a reduction gearing.

Means is provided for attaching a rotary cutting reel type of lawn mower 31 to and mounting the same transversely of and beneath the front portion of the frame 5. This conventional or standard lawn mower includes a main tie rod 32 which connects end castings 33 on which are mounted the usual traction wheels 34 and the driving mechanism whereby the movement of the traction wheels 34 drives the cutting reel 35 equipped with cutting blades 36. The driving mechanism of the motor is well known and need not be illustrated or described herein. As usual, when the lawn mower is propelled forwardly, its traction wheels 34 drive the cutting reel 35 to cut the grass. Secured to each of the end castings 33 are bracket portions 37 to which are secured other brackets 38 for supporting a standard wood roller 39 in a manner well known in the art. Portions of the brackets 37 support the fixed cutting blade 40 for cooperation with the blades 36 of the cutting reel 35. The castings 33 carry the usual lugs 41 which are ordinarily received in the ends of a handle yoke to attach the handle to the mower. In making use of the mower, I dispense with the handle and provide the forward end portion of frame 5 with a transversely disposed mower attaching bracket 42 of inverted U-shape. As shown more clearly in Figures 4 and 5, a rod 43 extends transversely of the frame and connects the side rails 6 thereof near the front ends of the latter, and the bracket 42 is provided with spaced upwardly projecting ears 44 through which the rod 43 extends, said ears 44 being disposed against the inner sides of the side rails 6. The ends of bracket 42 project beyond the side rails 6 and are formed in their depending portions with openings 45 in which the lugs 41 of the lawn mower are engaged. Thus, means is provided whereby the lawn mower is held in position beneath the forward end of the frame 5, and whereby, when the tractor is propelled forwardly, the lawn mower is moved along therewith. The lawn mower is held in proper relationship to the tractor to insure constant engagement of the roller 39 with the ground, by connecting the tie rod 32 of the mower with the front transverse frame member 7 by means of a tension spring 45' as seen in Figure 5. As the frame 5 is normally tilted forwardly by the weight of the engine 13, good tractive effort is insured between the wheels 34 of the lawn mower and the ground. Attached to and depending from the forward end of the frame 5 is a transversely disposed guard member 46 consisting of a generally U-shaped strip of metal having its ends fixed to the side rails 6. This guard member prevents passage of objects to the cutting reel of the lawn mower beneath the front end of the frame, such as might cause injury to the cutting reel or its blades. It will be noted that the bracket 42 has a detachable end portion 47 bolted to the remaining or major portion thereof. Thus, by engaging one lug 41 in the opening provided at 45 in the main portion of bracket 42, and by engaging the other lug 41 in the opening of the detachable end portion 47, said detachable end portion 47 may be properly disposed and bolted at 48 to the main portion of bracket 42 to provide for quickly mounting the lawn mower in place. In a like manner, by unbolting the end portion 47, the mower may be readily dismounted with respect to the tractor.

An angle bracket 49 is rigidly bolted as at 50 to the rear cross member 7 of frame 5, and such bracket has a depending arm provided with a longitudinal elongated slot 51 to facilitate adjustable bolting of an earth working unit 52 to the bracket 49 as at 53. The unit 52 is shown as a cultivating unit having a frame composed of a U-shaped part 54 which is bolted intermediate its ends to the bracket 49 at 53, said part 54 having outturned ends 55. The frame of the cultivating unit further includes a straight elongated bar member 56 having its ends secured to the outturned ends 55 of frame part 54. Spring cultivator teeth 57 are bolted respectively to opposite ends of the intermediate portion of frame part 54 and to the outturned ends 55 of the latter, as well as to the intermediate portion of bar part 56 of the unit frame, as at 58. It will be apparent that the elongated slot 51 permits vertical adjustment of the cultivating or like earth working unit so that the earth working elements or teeth 57 may operate properly according to different conditions met with in use.

When using the earth working unit, the lawn mower will of course be detached, and the depth at which the teeth 56 penetrate the ground may be properly governed by the attendant or operator pressing downwardly on the handles 10 at the rear of the machine in opposition to the weight of engine 13. When the device is at rest with only the cultivating unit used, the frame 5 will tilt forwardly until the guard member 56 contacts the ground, the latter thus forming a prop to limit such tilting movement. On the other hand, when the lawn mower is being used, the weight of the engine tilts the frame 5 forwardly so as to secure proper tractive engagement of the lawn mower wheels 34 with the ground, as required for proper driving of the reel 35.

From the foregoing description, it is believed that the construction, operation and advantages of the present invention will be readily understood and appreciated by those skilled in the art. Modifications and changes in details of construction are contemplated, such as verily fall within the spirit and scope of the invention as claimed.

Having described the invention, what is claimed as new is:

In a tractor mower assembly, a wheeled frame, a rod carried by and extending transversely of the frame, an inverted U-shaped bracket arranged between the ends of the frame and beneath the frame and having ears at the sides of the frame through which said rod extends, the end of said bracket projecting beyond the sides of the frame and having depending end portions provided with openings, a rotary reel-type lawn mower disposed beneath the frame and between the ends thereof and including end castings having reel driving traction wheels mounted thereon, a tie-rod connecting the end castings, and lugs carried by the end castings and removably engaged in the openings of the bracket, and a tension spring attached at one end to the frame and extending downwardly and rearwardly and connected to said tie-rod.

CORBIN W. DURHAM.

REFERENCES CITED

The following references are of record in the file of this patent:

UNITED STATES PATENTS

| Number | Name | Date |
| --- | --- | --- |
| 1,304,372 | Reed | May 20, 1919 |
| 1,383,637 | Keese | July 5, 1921 |
| 1,392,992 | Warner | Oct. 11, 1921 |
| 1,651,579 | Bolens | Dec. 6, 1927 |
| 1,978,338 | Bready | Oct. 23, 1934 |
| 2,097,351 | Smith | Oct. 27, 1937 |
| 2,260,344 | Shaw | Oct. 28, 1941 |
| 2,367,466 | Loy | Jan. 16, 1945 |
| 2,368,290 | Donald | Jan. 30, 1945 |